J. W. NICHOLAS.
BALING PRESS.
APPLICATION FILED NOV. 1, 1912.

1,075,056.

Patented Oct. 7, 1913.
3 SHEETS—SHEET 1.

Witnesses
Wm. H. Mulligan.

Inventor
J. W. Nicholas
By Victor J. Evans.
Attorney

J. W. NICHOLAS.
BALING PRESS.
APPLICATION FILED NOV. 1, 1912.

1,075,056.

Patented Oct. 7, 1913.
3 SHEETS—SHEET 2.

Inventor
J. W. Nicholas.

Witnesses
Wm H. Mulligan.

By Victor J. Evans.
Attorney

J. W. NICHOLAS.
BALING PRESS.
APPLICATION FILED NOV. 1, 1912.

1,075,056.

Patented Oct. 7, 1913.
3 SHEETS—SHEET 3.

Inventor
J. W. Nicholas.

Witnesses
Wm H. Mulligan.

By Victor J. Evans.
Attorney

UNITED STATES PATENT OFFICE.

JOSEPH W. NICHOLAS, OF FREESTONE, TEXAS.

BALING-PRESS.

1,075,056.  Specification of Letters Patent.  Patented Oct. 7, 1913.

Application filed November 1, 1912. Serial No. 729,088.

*To all whom it may concern:*

Be it known that I, JOSEPH W. NICHOLAS, a citizen of the United States, residing at Freestone, in the county of Freestone and State of Texas, have invented new and useful Improvements in Baling-Presses, of which the following is a specification.

This invention relates to presses for baling hay, straw, fodder, corn husks and other materials.

The principal object of the invention is to produce a baling press of the character described which shall be very simple in construction and inexpensive and which may be conveniently and effectively operated by hand.

A further object of the invention is to produce a hand press which shall be light and efficient and which may be readily moved from place to place for convenience in operation, avoiding unnecesssary moving of the material that is to be compressed.

A further object of the invention is to produce a hand baling press including a head block which may be very easily and quickly released after a bale has been compressed and tied in order to enable such bale to be removed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
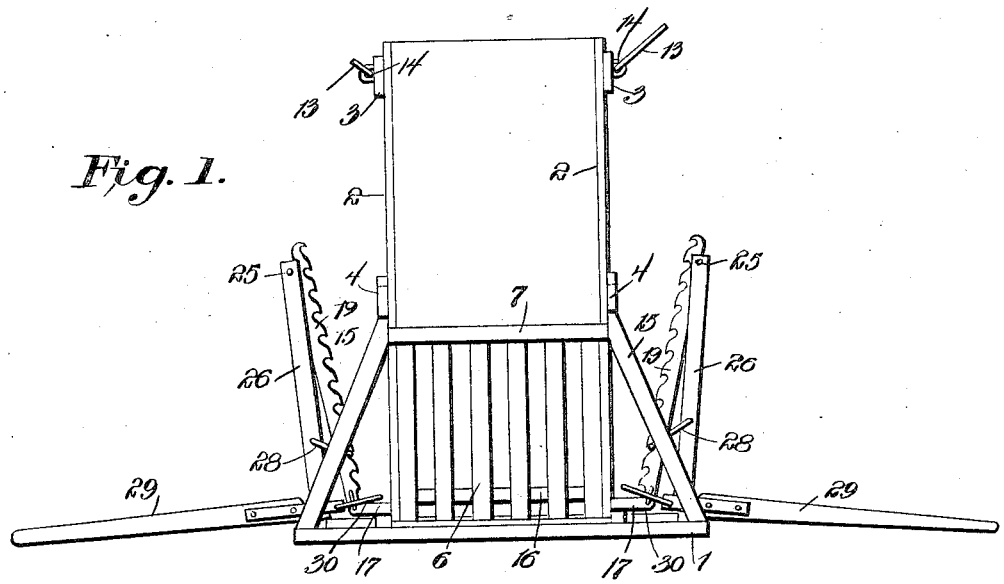
Figure 2:
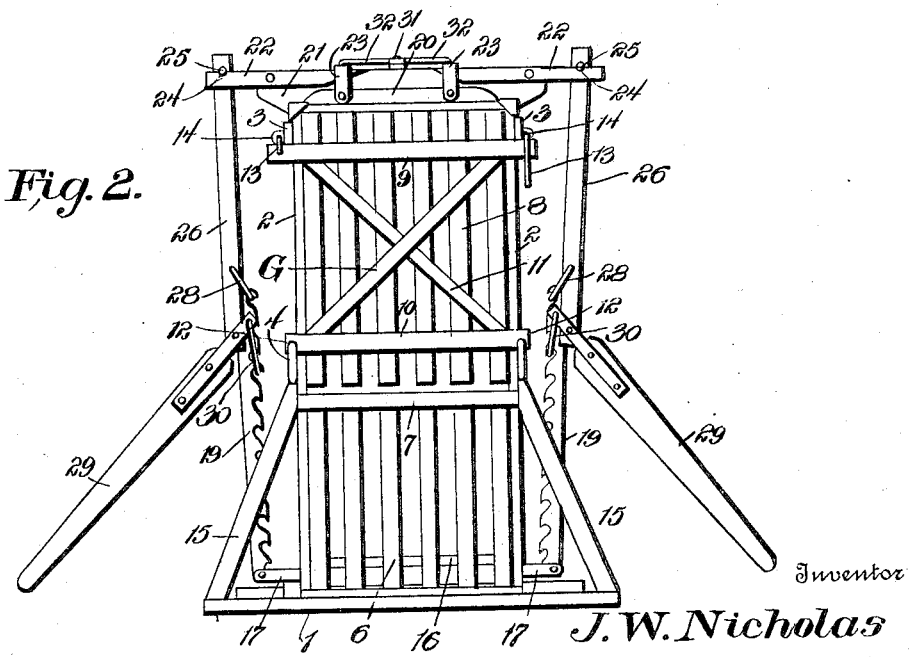
Figure 3:
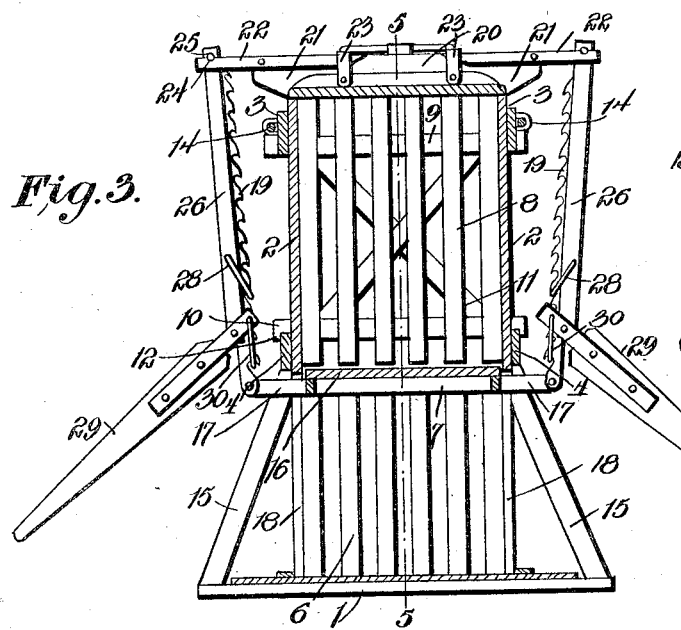
Figure 4:
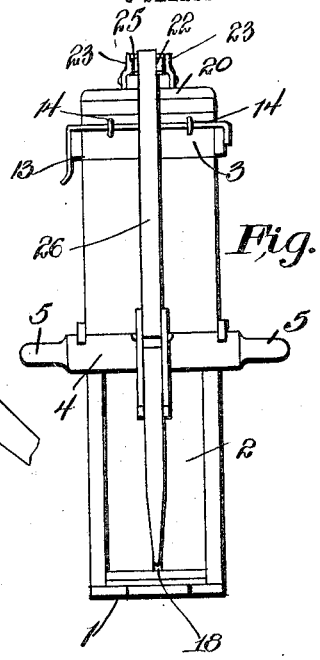
Figure 6:
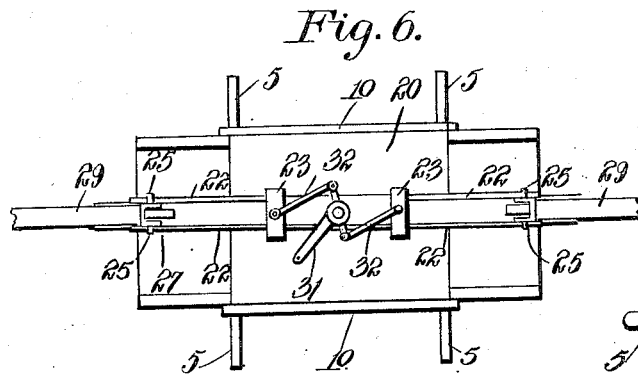
Figure 5:
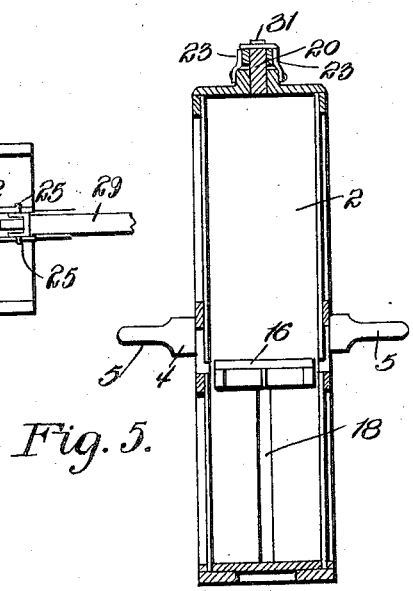
Figure 7:
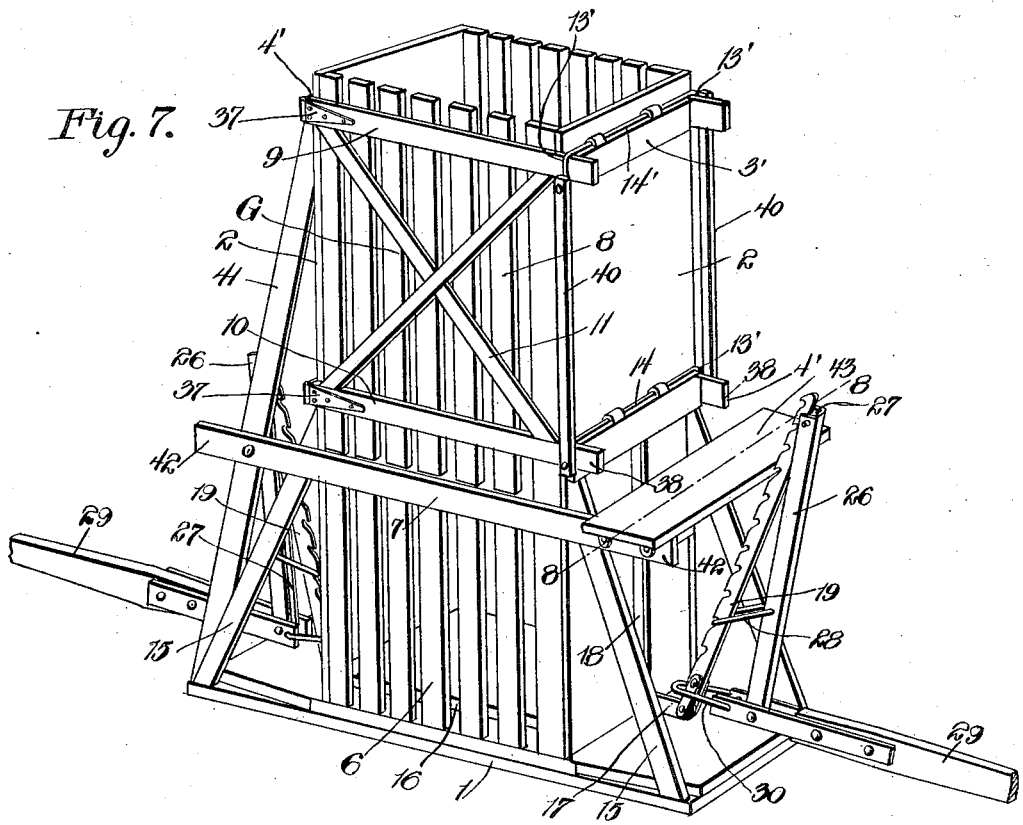
Figure 8:
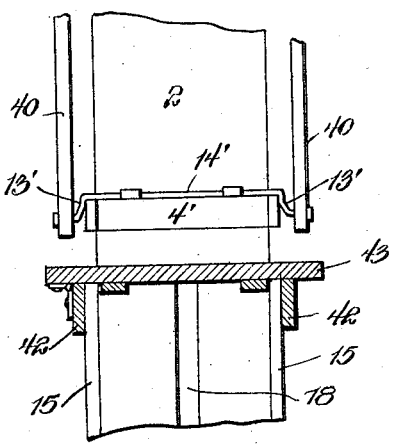

In the drawings,—Figure 1 is a side elevation, showing the improved press with the head block removed and ready to receive a charge. Fig. 2 is a sectional elevation showing the press with the head block replaced and ready for operation. Fig. 3 is a sectional elevation, showing the press as it appears after the bale has been compressed and tied. Fig. 4 is an end view of the press as it appears in Fig. 3. Fig. 5 is a vertical sectional view taken on the line 5—5 in Fig. 3. Fig. 6 is a top plan view. Fig. 7 is a perspective view illustrating a modified form of the invention. Fig. 8 is a sectional detail view taken on the line 8—8 in Fig. 7.

Corresponding parts in the several figures are denoted by like characters of reference.

The frame of the improved press box includes sills 1 on which the end walls 2 are firmly secured, said end walls being provided near their upper ends with cross bars or cleats 3 and intermediate their upper and lower ends with cross bars or cleats 4 which are extended beyond the end walls to form handles 5, whereby the press may be conveniently lifted and carried from place to place. The lower portions of the front and rear side walls of the press box are formed of slats 6, the lower ends of which may be secured upon the sills and the upper ends of which are secured on cross bars 7, the ends of which may be bolted or otherwise secured on the end walls 2. The upper portions of the front and rear side walls are formed by detachable gates G which are composed of vertical slats 8 secured upon and connected by upper and lower cross bars 9, 10 and reinforced by diagonal braces 11. The lower cross bars 10 may be seated in notches 12 in the upper edges of the handle members 5. The upper cross bars 9 are adapted to be engaged by the hooked ends 13 of rock shafts 14 which are stapled upon the cross bars 3 at the upper ends of the side walls of the press box. Some of the hooked ends 13 may be extended to form handles whereby the rock shafts may be oscillated for the purpose of engaging the hooked end portions 13 with or disengaging them from the cross bars 9 of the gates, which latter may thus be readily secured in position or released, as may be required. The slats 8 included in the construction of the gates G are obviously to be placed in alinement with the slats 6 included in the construction of the lower portions of the front and rear walls of the press box. The press box is reinforced by inclined braces 15 extending from the ends of the sills and terminating directly below the cross bars 4.

A follower 16 is provided to operate within the press box. Said follower is provided with arms 17 extending through vertical slots 18 in the lower portions of the side walls, and pivotally connected with said arms are ratchet bars 19 that constitute jacks whereby the follower may be moved in an upward direction for the purpose of compressing the bale.

A head block 20 is supported on the upper edges of the side walls 2, said head block being reinforced by a cross bar or brace 21 on which pairs of levers 22 are fulcrumed, said levers having short arms that project from the side edges of the head block and long arms that project in the direction of the medial line of said head block, said long arms being adapted to be engaged by pivoted keepers 23, whereby the levers will be maintained in an approximately horizontal position. The short arms of the levers 22 are provided near their outer ends with notches 24 to support the ends of a pin or bolt 25 extending transversely through the upper end of a link bar 26, one link bar being thus supported between the projecting ends of each pair of levers 22. Each of the link bars 26 is provided in the face thereof with a groove 27 wherein one of the ratchet bars or jacks 19 is fitted to slide vertically. Each of the link bars 26 is provided with a pivoted link 28, the free end of which is adapted to engage the teeth of the ratchet bar or jack 19. Each of the link bars 26 also carries at its lower end a bifurcated lever 29 carrying a pivoted link 30 engaging the teeth of the ratchet bar or jack sliding in the groove of such link bar.

It will be seen that when the press box is assembled to receive a charge of material to be compressed, the follower 16 is positioned at the lower extremity of the press box. When the charge has been placed in the press box and the head block has been positioned upon the upper ends of the end walls 2, the ratchet bars or jacks are placed within the grooves of the link bars at the lower ends of the latter, being there retained by the links 30 or 28, or by both of said links. By manipulating the levers the ratchet bars or jacks carrying the follower with the superposed load will now be lifted step by step, the downward movement of the free ends of the levers 29 serving to lift the ratchet bars until certain teeth of said bars are engaged by the links 28 which will serve to support the ratchet bars and the follower in position, while the free ends of the levers are being raised for the purpose of placing the links 30 in engagement with a lower tooth. The operation is continued until the follower has been elevated to a point above the stationary lower portions of the front and rear walls of the press box. The pivoted keepers 23 are now disengaged from the inner arms of the levers 22, permitting said arms to swing upward, thereby permitting the head block to be disassembled from the press. The gates G may now be removed by first oscillating the rock shafts 14 so as to turn the hook members 13 to a non-engaging position, and the bale may now be easily removed, it being assumed that said bale has been previously tied in a well known manner. Means may also be provided for the purpose of sustaining the follower in a raised position until the bale has been removed, but such means are not necessarily a part of the press structure.

For the purpose of conveniently manipulating the keepers 23 to place them in or out of engagement with the inwardly extending arms of the levers 22, a hand lever 31 may be pivoted intermediate the keepers 23, said hand lever being connected with each of said keepers by means of links 32 which are connected with said lever at opposite points with respect to the fulcrum thereof. It is evident that by said lever the keepers may be conveniently and simultaneously operated.

Under the modified construction illustrated in Figs. 7 and 8 the gates G that constitute parts of the side walls of the press box are hingedly supported, said gates being connected by means of hinges 37 with the cross bars 3 and 4 on one of the end walls 2 of the press box. The leaves of the hinges 37 are secured, respectively, on the cross bars 3 and 4 associated with one end wall of the press box and on the cross bars 9 and 10 of the gates, adjacent to one of the ends of said cross bars 9 and 10. The opposite ends of said cross bars 9 and 10 are extended to form brackets 38 adapted to be engaged by arms 13' of rock shafts 14' which in this instance are supported on the cross bars 3 and 4 upon the end walls of the press box adjacent to the free ends of the gates. The cranks 13' at one end of the rock shafts are connected together by a pitman rod 40 which constitutes a handle, whereby the two rock shafts may be simultaneously actuated for the purpose of placing the arms 13' into or out of engagement with the projecting bracket portions 38 of the cross bars 9 and 10 of the gates, thus enabling the gates at the two sides of the press box to be simultaneously secured or released by a single movement of the pitman bar 40. By thus supporting the gates the necessity is avoided for lifting them to and from the press. When this form of the invention is employed, it is also preferred to use special braces 41 connecting the top of the press box at the end where the gates are hingedly supported with the base 1 for the purpose of assisting in supporting the weight of the gates and reinforcing the structure generally. In the modified form of the press I also omit the extended portions of the cross bars 4 which, as best seen in Figs. 4 and 5, constitute handles 5; in place thereof the cross bars 7 are terminally extended to form handles 42 adjacent to the two ends of the press box, and whereby the latter may be conveniently lifted and carried from one place to another. Hingedly connected with one of the handles 42 at one end of the press box is a shelf 43, the free end of which may be supported on the opposite handle 42, thus forming a platform on which an operator may be very conveniently stationed when the press is in use, for the purpose of tamping the material that is placed in the press box for the purpose of being compressed and for the purpose of otherwise operating and manipulating the press.

Having thus described the invention, what is claimed as new, is:—

1. In a baling press, a press box having gates, a head block supported detachably on the box, a follower having arms extending through the side walls of the box, said side walls being provided with vertical slots, ratchet bars connected pivotally with the arms of the follower, pairs of levers fulcrumed on and extending beyond the side edges of the head block, trip means to support said levers in extended position, link bars suspended from said levers and having grooves in which the ratchet bars are slidably arranged, said link bars having pivoted links engaging the ratchet bars, and bifurcated levers fulcrumed on the link bars and having pivoted links engaging the ratchet bars.

2. In a baling press of the character described, a press box having slotted side walls, a follower having arms extending through the slots, a head block loosely supported on the press box, levers fulcrumed on the head block and having arms projecting beyond the side edges thereof, pivoted keepers to engage the inwardly extending arms of the levers, a hand lever fulcrumed intermediate the keepers, links connecting said hand lever with the keepers, link bars supported on the projecting arms of the levers and having grooved faces, ratchet bars pivotally connected with the arms of the follower and fitted slidably in the grooves of the link bars, and means connected with the link bars to engage the ratchet bars and to move said ratchet bars step by step in an upward direction.

In testimony whereof I affix my signature in presence of two witnesses.

JOSEPH W. NICHOLAS.

Witnesses:
  B. C. GILLIAM,
  R. Q. McSWANE.

---

Copies of this patent may be obtained for five cents each, by addressing the "Commissioner of Patents, Washington, D. C."